United States Patent
Chen (10) Patent No.: US 10,647,370 B2
(45) Date of Patent: May 12, 2020

(54) ELECTRIC SCOOTER STORAGE METHOD BASED ON SCOOTER STORAGE BOX

(71) Applicant: Xuewen Chen, Beijing (CN)

(72) Inventor: Xuewen Chen, Beijing (CN)

(73) Assignee: Xuewen Chen, Beijing (CN)

( * ) Notice: Subject to any disclaimer, the term of this patent is extended or adjusted under 35 U.S.C. 154(b) by 0 days.

(21) Appl. No.: 16/162,424

(22) Filed: Oct. 17, 2018

(65) Prior Publication Data

US 2020/0031413 A1 Jan. 30, 2020

(51) Int. Cl.
| | |
|---|---|
| *B62H 3/12* | (2006.01) |
| *G07F 17/00* | (2006.01) |
| *B62K 15/00* | (2006.01) |
| *G06Q 30/06* | (2012.01) |
| *B62H 3/00* | (2006.01) |

(52) U.S. Cl.
CPC ............ *B62H 3/12* (2013.01); *B62K 15/00* (2013.01); *G06Q 30/0645* (2013.01); *G07F 17/0057* (2013.01); *B62H 2003/005* (2013.01); *B62K 2202/00* (2013.01)

(58) Field of Classification Search
None
See application file for complete search history.

(56) References Cited

U.S. PATENT DOCUMENTS

| 2014/0129113 A1* | 5/2014 | Van Wiemeersch .... F02D 28/00 701/102 |
| 2017/0337622 A1* | 11/2017 | Denais ................. G06Q 20/145 |
| 2019/0263281 A1* | 8/2019 | Wang ................... G05D 1/0257 |

* cited by examiner

*Primary Examiner* — Thomas S McCormack
(74) *Attorney, Agent, or Firm* — Gang Yu (57) ABSTRACT

The disclosure provides an electric scooter storage method based on a scooter storage box. The scooter storage box is configured to store at least one electric scooter, The scooter storage box includes a box body, a bracket arranged in the box body and used for storing the electric scooter, an access port, and an interaction device. The method further includes: if the interaction device detects a scooter taking-out instruction, verifying identity information of a scooter taking-out user; if the verification is passed, conveying the electric scooter to the access port, and opening the access port; and if it is detected that the electric scooter is taken out from the bracket, recording renting information of the electric scooter, the renting information at least including: user information of a scooter taking-out user who takes out the electric scooter, and identification information and renting time of the electric scooter. The disclosure solves the problem in the conventional art that an electric scooter is easily damaged during the open storage in public places.

16 Claims, 4 Drawing Sheets

ELECTRIC SCOOTER STORAGE METHOD BASED ON SCOOTER STORAGE BOX

TECHNICAL FIELD

The embodiments of the disclosure relate to the technical field of electric scooter storage, and more particularly to an electric scooter storage method based on a scooter storage box.

BACKGROUND

For convenience of a short-distance travel, an electric scooter may be set as a shared electric scooter to be leased by a user, which requires to put multiple electric scooters in public places. However, the existing electric scooter has the defects that the scooter is easily damaged and lost, is not safely charged, occupies a large space and affects the appearance of a city due to open storage. Currently, an effective solution has not been proposed yet for the foregoing problem.

SUMMARY

The embodiments of the disclosure provide an electric scooter storage method based on a scooter storage box, intended to solve the problem in the conventional art that an electric scooter is easily damaged during the open storage in public places.

In order to solve the foregoing problem, according to an aspect of the disclosure, the disclosure provides an electric scooter storage method based on a scooter storage box. The scooter storage box is configured to store at least one electric scooter, The scooter storage box includes a box body, a bracket arranged in the box body and used for storing the electric scooter, an access port, and an interaction device. The method further includes that: if the interaction device detects a scooter taking-out instruction, identity information of a scooter taking-out user is verified; if the verification is passed, the electric scooter is conveyed to the access port, and the access port is opened; and if it is detected that the electric scooter is taken out from the bracket, renting information of the electric scooter is recorded, the renting information at least including: user information of a scooter taking-out user who takes out the electric scooter, and identification information and renting time of the electric scooter.

In an embodiment of the disclosure, in the case of providing multiple brackets in the scooter storage box, the scooter storage box further includes: a conveying mechanism arranged inside the scooter storage box, the multiple brackets being arranged on the conveying mechanism at intervals, wherein when the verification of the identity information of the scooter taking-out user is passed, the conveying mechanism is controlled to convey the bracket carrying the electric scooter in the multiple brackets to the access port.

In an embodiment of the disclosure, the bracket of the scooter storage box is provided with a charging portion electrically connected to the electric scooter to charge the electric scooter, wherein before conveying the electric scooter to the access port and opening the access port, the method further includes that: the electric quantity of the electric scooter placed on each bracket is detected; if the electric quantity is sufficient, the electric scooter with the sufficient electric quantity is conveyed to the access port; and if the electric quantity is insufficient, the charging portion is controlled to charge or not, based on the electric quantity of the electric scooter with the insufficient electric quantity.

In an embodiment of the disclosure, the conveying mechanism includes: an annular conveying chain, arranged in the box body along a vertical direction; and a driving wheel, in driving connection with the annular conveying chain, the driving wheel being used for driving the annular conveying chain to, rotate, the multiple brackets being hinged to the annular conveying chain along the circumference of the annular conveying chain.

In an embodiment of the disclosure, the interaction device includes: an operation panel and a face recognition device, wherein if a scooter taking-out key on the operation panel is pressed down, the scooter taking-out instruction is generated, facial feature information of the scooter taking-out user is recognized by the face recognition device, and the identity information of the scooter taking-out user is verified based on the facial feature information.

In an embodiment of the disclosure, in the case of verification failure, verification is performed again, or, the identity information is registered.

In an embodiment of the disclosure, in the process of detecting that the electric scooter is taken out from the bracket, a sensor senses whether the electric scooter is safely taken out, if so, the access port is closed, otherwise, prompt information is given, and the access port is controlled to be closed after delaying for a predetermined time, the prompt information is used for prompting that the electric scooter is not safely taken out.

In an embodiment of the disclosure, after renting information of the electric scooter is recorded, the method further includes that: order information is generated, the order information at least including: an order number, and the identification information, renting time and charging information of the taken-out electric scooter; and the order information is sent to the cloud server.

In an embodiment of the disclosure, the bracket includes: a chassis with a recess portion and a carrying surface, the recess portion is configured to hold a wheel of the electric scooter, and the carrying surface urging against the lower surface of a pedaling portion of the electric scooter.

According to another aspect of the disclosure, an electric scooter storage method based on a scooter storage box is also provided. The scooter storage box is configured to store at least one electric scooter. The scooter storage box includes a box body, a bracket arranged in the box body and used for storing the electric scooter, an access port, and an interaction device. The method further includes that: if the interaction device detects a scooter returning instruction, identification information of an electric scooter to be returned is collected; if the collection succeeds, an unoccupied bracket is conveyed to the access port, and the access port is opened; and if it is detected that the electric scooter is placed on the unoccupied bracket, it is determined that the electric scooter is successfully returned, and charging information of the successfully returned electric scooter is generated, the charging information at least including: user information of the user who takes out the electric scooter, and identification information, travel information and generated rent of the electric scooter.

In an embodiment of the disclosure, in the case of providing multiple brackets in the scooter storage box, the scooter storage box further includes: a conveying mechanism arranged inside the scooter storage box, the multiple brackets being arranged on the conveying mechanism at intervals, wherein when the scooter returning instruction is detected, the conveying mechanism is controlled to convey the unoccupied bracket in the multiple brackets to the access port.

In an embodiment of the disclosure, the bracket of the scooter storage box is provided with a charging portion electrically connected to the electric scooter to charge the electric scooter, wherein before the unoccupied bracket is conveyed to the access port and the access port is opened, the method further includes that: it is detected whether the charging portion arranged on the unoccupied bracket is in a normal state; if it is in the normal state, the unoccupied bracket is conveyed to the access port; and if it is in an abnormal state, it is detected whether charging portions on other brackets are in the normal state or not, and if there is no bracket with a charging portion in the normal state, the access port is prohibited from opening.

In an embodiment of the disclosure, the conveying mechanism includes: an annular conveying chain, arranged in the box body along a vertical direction; and a driving wheel, in driving connection with the annular conveying chain, the driving wheel being used for driving the annular conveying chain to rotate, the multiple brackets being hinged to the annular conveying chain along the circumference of the annular conveying chain.

In an embodiment of the disclosure, the interaction device includes: an operation panel and an RFID receiver, wherein if a scooter returning key on the operation panel is pressed down, the scooter returning instruction is generated, identification information of the electric scooter to be returned is received through the RFID receiver, and the access port is opened based on the identification information.

In an embodiment of the disclosure, in the case of collection failure in the identification information of the electric scooter to be returned, timing is started, and at least one of the following instruction information is given to a background server during the timing: a repair instruction for prompting that the electric scooter needs to be repaired, and an assistance instruction for prompting that the access port needs to be opened by remote assistance, wherein if time reaches a predetermined time, the access port is automatically opened.

In an embodiment of the disclosure, in the process of detecting that the electric scooter is placed on the unoccupied bracket, a sensor senses whether the electric scooter is safely put in, if so, the access port is closed, otherwise, prompt information is given, and the access port is controlled to be closed after delaying for a predetermined time, the prompt information is used for prompting that the electric scooter is not safely put in.

In an embodiment of the disclosure, after it is determined that the electric scooter is successfully returned and charging information of the successfully returned electric scooter is generated, the method further includes that: a payment result of paying for the charging information is acquired, and the charging information and/or the payment result are sent to a cloud server; and the cloud server completes corresponding order information based on the charging information and/or the payment result, and sends the final order information to a scooter taking-out user who takes out the electric scooter.

According to the technical solution of the disclosure, the scooter storage box includes a box body, a bracket arranged in the box body and used for storing the electric scooter, an access port, and an interaction device. The method further includes that: if the interaction device detects a scooter taking-out instruction, identity information of a scooter taking-out user is verified; if the verification is passed, the electric scooter is conveyed to the access port, and the access port is opened; and if it is detected that the electric scooter is taken out from the bracket, renting information of the electric scooter is recorded, the renting information at least including: user information of a scooter taking-out user who takes out the electric scooter, and identification information and renting time of the electric scooter.

BRIEF DESCRIPTION OF THE DRAWINGS

The accompanying drawings, which constitute a part of this application, are used to provide a further understanding of the disclosure, and the exemplary embodiments of the disclosure and the description thereof are used to explain the disclosure, but do not constitute improper limitations to the disclosure. In the drawings.

DETAILED DESCRIPTION OF THE EMBODIMENTS

The technical solutions in the embodiments of the disclosure will be clearly and completely described hereinbelow with the drawings in the embodiments of the disclosure. It is apparent that the described embodiments are only part of the embodiments of the disclosure, not all of the embodiments. The following description of at least one exemplary embodiment is only illustrative actually, and is not used as any limitation for the disclosure and the application or use thereof. On the basis of the embodiments of the disclosure, all other embodiments obtained on the premise of no creative work of those of ordinary skill in the art fall within the scope of protection of the disclosure.

In an electric scooter storage method based on a scooter storage box provided by the embodiment of the disclosure, the scooter storage box is used for storing an electric scooter, and the scooter storage box includes a box body, a bracket arranged in the box body and used for storing the electric scooter, an access port, and an interaction device.

Alternatively, a bracket for storing, an electric scooter is arranged in the box body, the bracket includes: a chassis 110 and a charging portion, the chassis 110 is provided with a recess portion for receiving a wheel of the electric scooter, the chassis 110 is also provided with a carrying surface urging against the lower surface of a scooter body of the electric scooter, and the charging portion is electrically connected to the electric scooter to charge the electric scooter.

Alternatively, the technical solution of the present embodiment provides a bracket in which the chassis 110 and the charging portion are arranged. Thus, the electric scooter may be limited and carried by the cooperation of the recess portion on the chassis 110 and the carrying surface, so that the electric scooter may be steadily stored and prevented from falling. Furthermore, the electric scooter may also be charged by the charging portion to meet the charging needs of the electric scooter. The bracket may be used separately, e.g., placed in public places fixedly, or may also be used in cooperation with other components.

Figure 1:
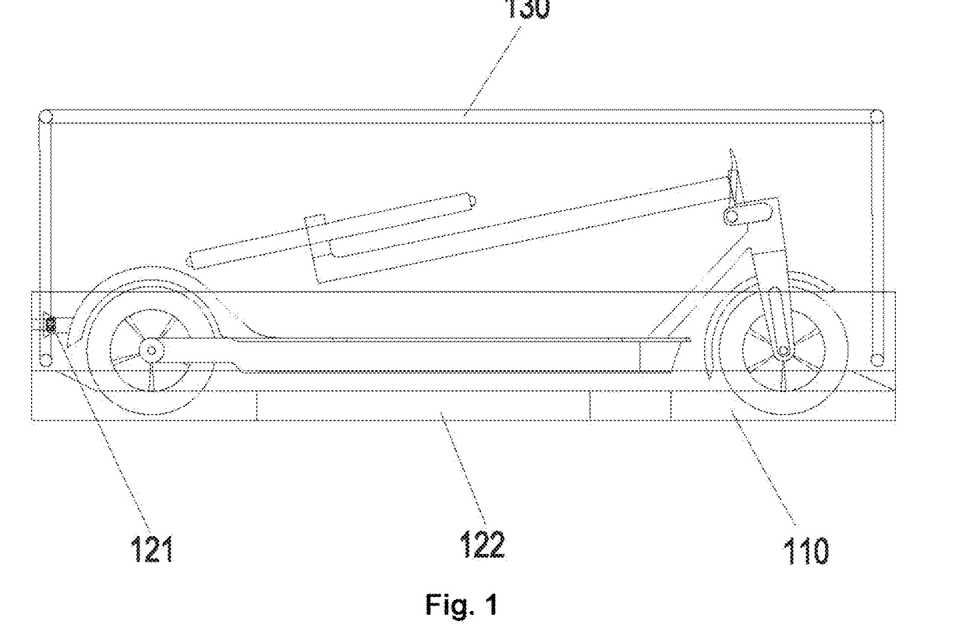
FIG. 1 illustrates a schematic diagram of a bracket put into an electric scooter.

Alternatively, a bracket stores an electric scooter, and the length direction of the put-in electric scooter is consistent with the length direction of the chassis. As shown in FIG. 1, 110 is a chassis, 121 is a charging plug, 122 is a wireless charging device, and 130 is a hanger.

Alternatively, in the present embodiment, the bracket further includes a vertical plate, the vertical plate is arranged on the chassis and located at one end of the length direction of the chassis, the charging portion includes: a charging plug, arranged on the vertical plate, the charging plug is electrically connected to the electric scooter to charge the electric scooter, and after being put to a predetermined position on the chassis, the electric scooter can be in insertion connection with the charging plug to realize electrical connection. Thus, after the electric scooter is put onto the chassis, the electric scooter is stored, and furthermore, the electrical connection may also be realized by insertion connection so as to charge the electric scooter. Thus, the operation can be reduced and it is convenient for management.

In the present embodiment, there may be one vertical plate and one charging plug, and an end of the chassis which is away from the vertical plate is a taking and putting end for taking out and putting in the electric scooter. There may also be two vertical plates and two charging plugs, the two vertical plates are located at both ends of the chassis respectively, the two charging plugs and the two vertical plates are in one-to-one correspondence, an area of the chassis which is located between the two vertical plates is a taking and putting area, the taking and putting area is used for taking out and putting in the electric scooter, and the electric scooter may be in insertion connection with one of the two charging plugs selectively. Thus, the electric scooter may be taken out or put in and charged by selecting any one of the two manners.

In the present embodiment, the charging portion includes: a wireless charging device, arranged on the chassis and used for wirelessly charging the electric scooter. Thus, the electric scooter may be charged wirelessly. The charging plug and the wireless charging device may be arranged in the bracket simultaneously, so as to select to adopt a wireless charging manner or a wired charging manner as required.

Alternatively, the shared electric scooter matched with the present system is an electric scooter with a foldable armrest. The electric scooter is provided with a control bin including SIM, GPS, Beidou satellite navigation system and RFID chips, and having functions of communication, positioning, close-range interaction recognition, information exchange and the like. A specially designed wired charging socket (plug) is installed at the tail of the electric scooter. A horn-shaped groove is provided in the front of the wired charging socket (plug). The device has a tail plug (socket) protecting function, intended to ensure the accuracy of butting the tail charging plug (socket) of the electric scooter and the wired charging socket (plug) on a scooter storage tray. A wireless charging receiving device is installed in a battery bin under a pedal of the electric scooter. Each electric scooter has a unique ID, and is recognized and confirmed by an RFID, an electronic card and the like.

To sum up, a three-dimensional electric scooter storage box (chamber) is of a box structure, and may be designed as rectangular or square boxes with different specifications. The three-dimensional electric scooter storage box (chamber) is provided with a central controller, has functions of recognizing user identity and credit by face recognition, mobile phone code scanning (such as WeChat and Alipay) and the like, has functions of information exchange with other electric scooter storage boxes (chambers) in the present system and the electric scooter in the present system through a cloud server, and has functions of customer settlement and payment. In four vertical faces of the box (chamber) body, the front vertical face is provided with an interactive screen, a camera, a microphone, a loudspeaker, a scooter storage and access port, an electric overhead door and the like, and other three sides vertical faces of the box (chamber) body are designed for a light box, a liquid crystal screen or other print advertisement carriers. The box (chamber) is provided with a three-dimensional scooter storage system including a bearing support structure, a motor, a gear, a transmission chain, and a scooter storage and charging tray.

Alternatively, the scooter storage box further includes a power supply device, arranged in the box body and used for supplying power to the scooter storage box. By means of the bracket provided in the disclosure, the electric scooter may be limited and carried by the cooperation of the recess portion on the chassis and the carrying surface, so that the electric scooter may be steadily stored and prevented from falling. Furthermore, the electric scooter may also be charged by the charging portion to meet the charging needs of the electric scooter. The bracket may be used separately, e.g., placed in public places fixedly, or may also be used in cooperation with other components. The storage box provided in the disclosure is convenient for storage, charging and management of the electric scooter in public places, so as to realize sharing of the electric scooter. The scooter storage box is adopted for self-service renting operation of an electric scooter, so that not only the parking occupation is greatly reduced, but also the safety of charging can be improved, and the field workload and, working strength of scooter collection and charging are reduced, thus reducing the labor cost and the transportation cost.

It is to be noted that the three-dimensional scooter storage box (chamber) is arranged at a fixed, place in a targeted storage manner, and is different from a renting operation mode centering on a mobile phone APP (mobile phone-based scooter searching, unlocking, settlement, and scooter renting and returning anywhere) by serving as a central facility of the present renting system. It is unnecessary to search and track the position of each scooter in the system, and it is unnecessary to lock and unlock the scooter.

Figure 2:
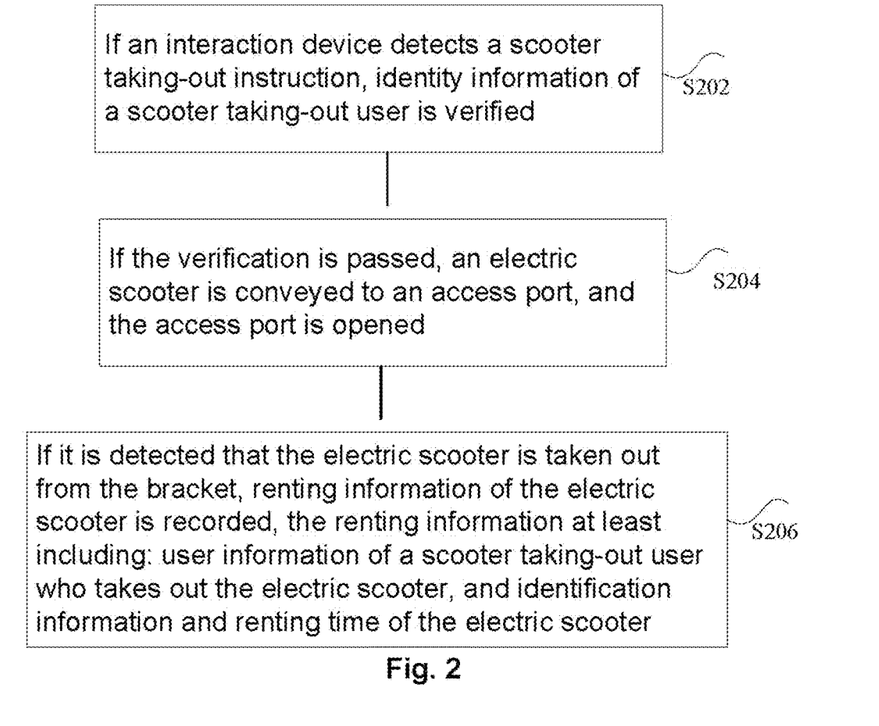
FIG. 2 shows a flowchart of an electric scooter storage method based on scooter storage box according to an embodiment of the disclosure.

FIG. 2 is an electric scooter storage method based on scooter storage box according to an embodiment of the disclosure. As shown in FIG. 2, the method includes the steps as follows.

In step S202, if an interaction device detects a scooter taking-out instruction, identity information of a scooter taking-out user is verified.

The above interaction device includes: an operation panel and a face recognition device, wherein if a scooter taking-out key on the operation panel is pressed down, the scooter taking-out instruction is generated, facial feature information of the scooter taking-out user is recognized by the face recognition device, and the identity information of the scooter taking-out user is verified based on the facial feature information.

Alternatively, when a customer rents a scooter, the customer first presses a scooter renting key on an interactive screen of a scooter storage box (chamber). The interactive screen will display information such as the ID of an electric scooter that can be rent in the scooter storage box, and the battery capacity of each electric scooter. After the customer selects the ID of the scooter to be rented, the central controller will recognize the identity of an operator by using a face recognition technology.

In step S204, if the verification is passed, an electric scooter is conveyed to an access port, and the access port is opened.

Specifically, a camera, of the scooter storage box, will collect the front face image of the customer and compare the collected face image with customer archive information in a system database. After a customer archive highly consistent with an operator face image is retrieved in the system database and intelligent recognition and identity confirmation are performed, a central controller of the scooter storage box will control a motor, a gear and a transmission chain in the box to allocate a scooter storage tray carrying the electric scooter with an ID selected by the customer to a corresponding position inside the access port, and open an electric lifting door of the access port.

Alternatively, in the case of providing multiple brackets in a scooter storage box, the scooter storage box further includes: a conveying mechanism arranged inside the scooter storage box, the multiple brackets being arranged on the conveying mechanism at intervals, wherein when the verification of the identity information of the scooter taking-out user is passed, the conveying mechanism is controlled to convey the bracket carrying the electric scooter in the multiple brackets to the access port.

Alternatively, the bracket includes: a chassis with a recess portion and a carrying surface, the recess portion is configured to hold a wheel of the electric scooter, and the carrying surface urging against the lower surface of a pedaling portion of the electric scooter.

Alternatively, the bracket of the scooter storage box is provided with a charging portion electrically connected to the electric scooter to charge the electric scooter, wherein before conveying the electric scooter to the access port and opening the access port, the method further includes that: the electric quantity of the electric scooter placed on each bracket is detected; if the electric quantity is sufficient, the electric scooter with the sufficient electric quantity is conveyed to the access port; and if the electric quantity is insufficient, the charging portion is controlled to charge or not, based on the electric quantity of the electric scooter with the insufficient electric quantity.

Figure 3:
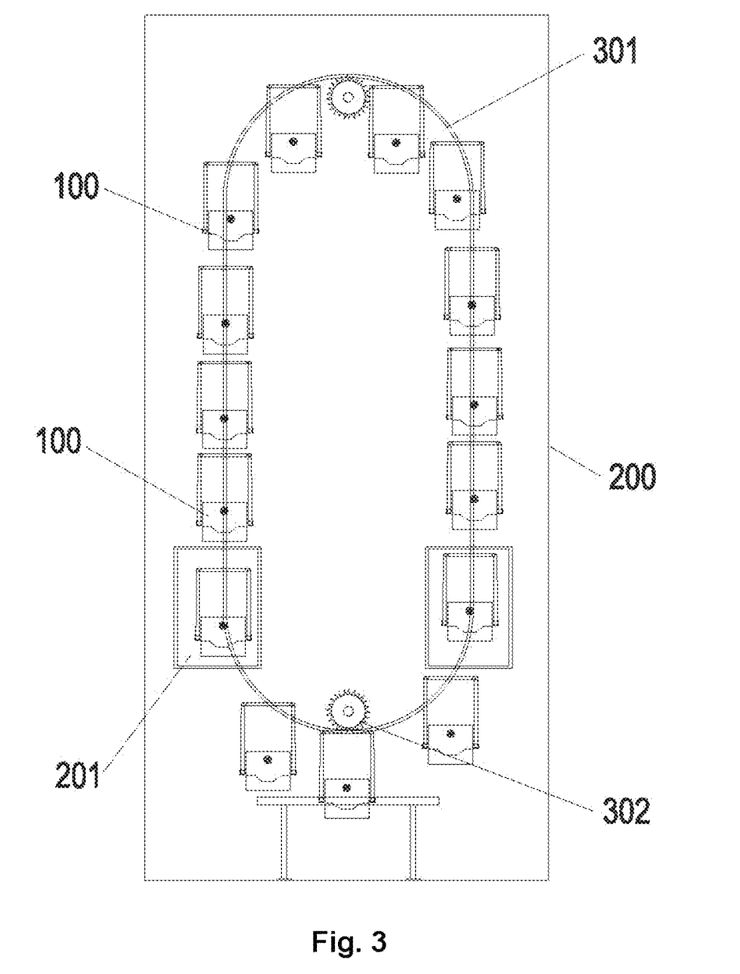
FIG. 3 illustrates a structure diagram of a conveying mechanism.

Alternatively, as shown in FIG. 3, the conveying mechanism includes: an annular conveying chain (301), arranged in the box body (200) along a vertical direction; and a driving wheel (302), in driving connection with the annular conveying chain (301), the driving wheel (302) being used for driving the annular conveying chain (301) to rotate, multiple brackets (100) being hinged to the annular conveying chain (301) along the circumference of the annular conveying chain (301).

Alternatively, the conveying mechanism is arranged in the scooter storage box, the multiple brackets 100 are arranged on the conveying mechanism at intervals, and the conveying mechanism can convey any one bracket 100 in the multiple brackets 100 to the access port 201. The annular conveying chain 301 rotates to drive the multiple brackets 100 to move upward or downward, so as to convey the needed bracket 100 to the access port 201. A motor may also be arranged in the conveying mechanism. The motor drives the driving wheel 302 to rotate, so as to drive the annular conveying chain 301 to rotate. Thus, multiple brackets 100 may be placed in the scooter storage box to store multiple electric scooters, so that the occupation space of the electric scooter can be reduced for convenience of management. Moreover, the conveying mechanism may convey the bracket 100 with the electric scooter to the access port 201 for convenience of the taking and using operation of a user, or may convey the unoccupied bracket 100 to the access port 201 for convenience of the returning process of the user.

Alternatively, in the case of verification failure, verification is performed again, or, the identity information is registered.

Alternatively, if a customer archive highly consistent with an operator face image is not retrieved in a system database and intelligent recognition and identity confirmation of an operator cannot be performed, the system will regard the current operator as a new customer, and will prompt the operator via voice to scan QR codes of WeChat and Alipay on the interactive screen by using a mobile phone. After the operator scans the QR codes of WeChat and Alipay on the interactive screen by using the mobile phone, the system will associate the operator face image collected by the camera of the scooter storage box with the personal WeChat and Alipay accounts to complete customer registration. Then, the central controller of the scooter storage box will allocate the electric scooter with an ID selected by the customer to a corresponding position inside the access port, and open the electric lifting door of the access port.

In step S206, if it is detected that the electric scooter is taken out from the bracket, renting information of the electric scooter is recorded, the renting information at least including: user information of a scooter taking-out user who takes out the electric scooter, and identification information and renting time of the electric scooter.

Alternatively, after renting information of the electric scooter is recorded, the method further includes that: order information is generated, the order information at least including: an order number, and the identification information, renting time and charging information of the taken-out electric scooter; and the order information is sent to a cloud server.

For example, the generated order information includes the following signals:
1) order number: S10548;
2) identification information of the taken-out, electric scooter: DN4520 or QR code or other recognizable patterns;
3) renting time: 13:15 pm;
4) charging information: 5 yuan/H; and
5) scooter taking-out area: Beidou satellite navigation system targeted scooter storage area.

Alternatively, in the process of detecting that the electric scooter is taken out from the bracket, a sensor senses whether the electric scooter is safely taken out, if so, the access port is closed, otherwise, prompt information is given, and the access port is controlled to be closed after delaying for a predetermined time, the prompt information is used for prompting that the electric scooter is not safely taken out.

For example, the prompt information may be a trigger sound reminder, and may be a female voice reminder such as "Please take your scooter out as soon as possible because the access port will be closed 10 seconds later. Have a nice trip.".

The prompt information may also be an information reminder, such as Alipay and WeChat associated with user information or a short message of a customer. For example, the received information is "Please take your electric scooter out as soon as possible because the access port will be closed 10 seconds later. Have a nice trip.".

Figure 4:
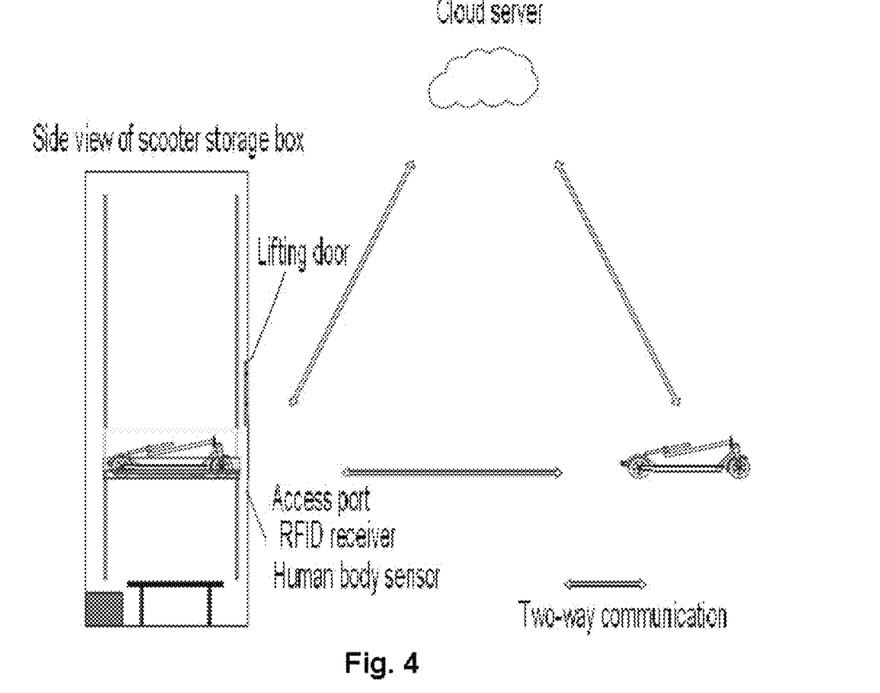
FIG. 4 illustrates a schematic diagram of an electric scooter storage process based on scooter storage box.

Alternatively, when the customer takes the scooter out and a sensor provided for the access port senses that the scooter has been safely taken out, the system will automatically close the electric lifting door of the access port and also send order information (including customer information, electric scooter number, renting box number, renting time and the like) to a cloud server. The schematic diagram of the entire process is as shown in FIG. 4.

Figure 5:
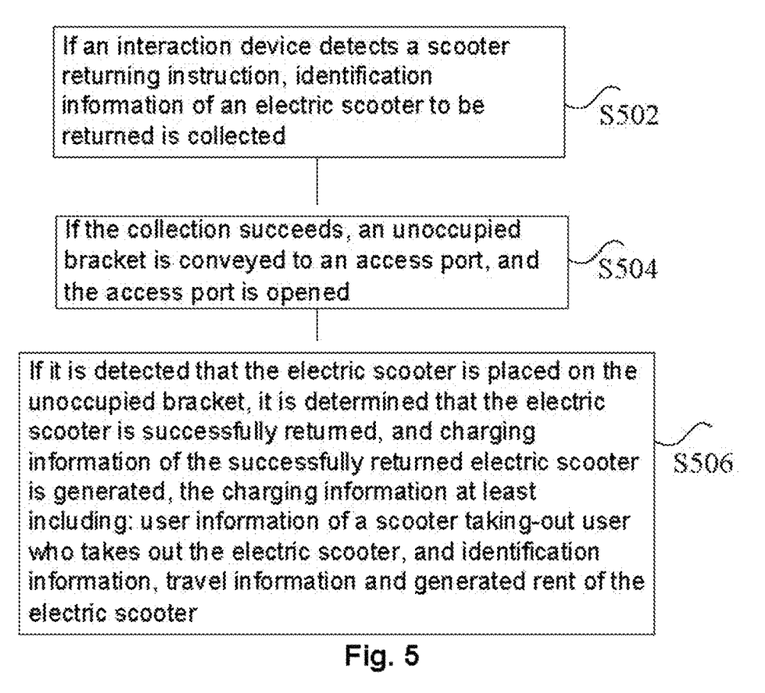
FIG. 5 shows a flowchart of an alternative electric scooter storage method based on scooter storage box according to an embodiment of the disclosure.

FIG. 5 is an electric scooter storage method based on a scooter storage box according to an embodiment of the disclosure. The scooter storage box is used for storing an electric scooter, and the scooter storage box includes a box body, a bracket arranged in the box body and used for storing the electric scooter, an access port, and an interaction device. As shown in FIG. 5, the method includes the steps as follows.

In step S502, if the interaction device detects a scooter returning instruction, identification information of an electric scooter to be returned is collected.

Alternatively, when a customer returns a scooter, the customer should press a scooter returning key on an interactive screen of a scooter storage box (chamber), and the interactive screen will display the number of available parking spaces (scooter storage and charging trays) in the scooter storage box. An RFID receiver in the scooter storage box (chamber) starts to receive and identify a signal transmitted by a scooter RFID transmitter carried by the customer.

In step S504, if the collection succeeds, an unoccupied bracket is conveyed to the access port, and the access port is opened.

Alternatively, in the case of providing multiple brackets in the scooter storage box, the scooter storage box further includes: a conveying, mechanism arranged inside the scooter storage box, the multiple brackets being arranged on the conveying mechanism at intervals, wherein when the scooter returning instruction is detected, the conveying mechanism is controlled to convey the unoccupied bracket in the multiple brackets to, the access port.

Alternatively, the bracket of the scooter storage box is provided with a charging portion electrically connected to the electric scooter to charge the electric scooter, wherein before the unoccupied bracket is conveyed to the access port and the access port is opened, the method further includes that: it is detected whether the charging portion arranged on the unoccupied bracket is in a normal state; if it is in the normal state, the unoccupied bracket is conveyed to the access port; and if it is in an abnormal state, it is detected whether charging portions on other brackets are in the normal state, and if there is no bracket with a charging portion in the normal state, the access port is prohibited from opening.

Alternatively, as shown in FIG. 3, the conveying mechanism includes: an annular conveying chain (301), arranged in the box body (200) along a vertical direction; and a driving wheel (302), in driving connection with the annular conveying chain (301), the driving wheel (302) being used for driving the annular conveying chain (301) to rotate, multiple brackets (100) being hinged to the annular conveying chain (301) along the circumference of the annular conveying chain (301).

Alternatively, the conveying mechanism is arranged in the scooter storage box, the multiple brackets 100 are arranged on the conveying mechanism at intervals, and the conveying mechanism can convey any one bracket 100 in the multiple brackets 100 to the access port 201. The annular conveying chain 301 rotates to drive the multiple brackets 100 to move upward or downward, so as to convey the needed bracket 100 to the access port 201. A motor may also be arranged in the conveying mechanism. The motor drives the driving wheel 302 to rotate, so as to drive the annular conveying chain 301 to rotate. Thus, multiple brackets 100 may be placed in the scooter storage box to store multiple electric scooters, so that the occupation space of the electric scooter can be reduced for convenience of management. Moreover, the conveying mechanism may convey the bracket 100 with the electric scooter to the access port 201 for convenience of the taking and using operation of a user, or may convey the unoccupied bracket 100 to the access port 201 for convenience of the returning process of the user.

Alternatively, the interaction device includes: an operation panel and an RFID receiver, wherein if a scooter returning key on the operation panel is pressed down, the scooter returning instruction is generated, identification information of the electric scooter to be returned is received through the RFID receiver, and the access port is opened based on the identification information.

Alternatively, if there is an available parking space (scooter storage and charging tray) in the scooter storage box, after the RFID receiver confirms that the scooter carried by the customer is the electric scooter of the present system, the central controller of the scooter storage box (chamber) will allocate an unoccupied scooter tray to a corresponding position inside a scooter returning port, and open an electric lifting door of the scooter returning port. The system prompts the customer to push the electric scooter to be returned onto the unoccupied tray in the scooter storage box (chamber) through a loudspeaker.

The prompt sound of the loudspeaker may be a female voice such as "The access port has been opened, please put a scooter in, and thank you for using it.".

Alternatively, when there is no available parking space (scooter storage and charging tray) in the scooter storage box, but the RFID receiver confirms that the scooter carried by the customer is the electric scooter of the present system, the central controller of the scooter storage box (chamber) will automatically call an online customer service, and the customer service will communicate with the customer through a scooter storage box voice and video system, or prompt the customer to return the scooter nearby, or agree with the customer to put the electric scooter outside the scooter storage box and perform settlement for the customer. The customer service will notify the field service to allocate scooters that cannot be stored into the box into other scooter storage boxes as soon as possible. The system will adjust the capacity of the scooter storage box (chamber) disposed at each place according to the situation of scooters in the scooter storage box at each place and the utilization situation of parking spaces, so as to improve the renting rate of the scooters and meet the needs of customers to return scooters into the box (chamber). If the RFID receiver in the scooter storage box (chamber) cannot recognize and confirm the scooter carried by the customer, the scooter storage box control system will prompt an operator to call the company customer service to handle this through a voice and video system on the scooter storage box via the voice.

In step S506, if it is detected that the electric scooter is placed on the unoccupied bracket, it is determined that the electric scooter is successfully returned, and charging information of the successfully returned electric scooter is generated, the charging information at least including: user information of a scooter taking-out user who takes out the electric scooter, and identification information, travel information and generated rent of the electric scooter.

Alternatively, in the process of detecting that the electric scooter is placed on the unoccupied bracket, a sensor senses whether the electric scooter is safely put in, if so, the access port is closed, otherwise, prompt information is given, and the access port is controlled to be closed after delaying for a predetermined time, the prompt information is used for prompting that the electric scooter is not safely put in.

For example, the prompt information is a voice prompt, which may be a female voice prompt sound such as "The scooter bracket is unoccupied. Please put the scooter onto the bracket as soon as possible because the access port will be closed 20 s later. Thank you for your cooperation.".

Alternatively, after it is determined that the electric scooter is successfully returned and charging information of the successfully returned electric scooter is generated, the method further includes that: a payment result of paying for the charging information is acquired, and the charging information and/or the payment result are sent to a cloud server; and the cloud server completes corresponding order information based on the charging information and/or the payment result, and sends the final order information to a scooter taking-out user who takes out the electric scooter.

For example, the order information is as follows:
1) user ID: Alipay 15742356078;
2) identification information of an electric scooter: DN4520;
3) travel information: 01:30:00;
4) generated rent: 7.5 yuan; and
5) ending time: 14:45 pm.

Specifically, the system will automatically close the electric lifting door of the scooter returning port after confirming that the electric scooter is stored in place and senses that there is no barrier at the port. The central controller of the scooter storage box (chamber) calls the stored order information (including customer information, electric scooter ID, renting box number, and rent starting time) of the electric scooter from a cloud server, calculates the current order renting cost, performs automatic settlement, displays the current order travel and cost for the customer through an interactive display screen, and sends the information to the mobile phone of the customer.

The Alipay and WeChat accounts or the mobile phone of the customer will receive scooter order information generated by the cloud server, and the customer may set direct deduction of the payment account for the order, or may also make payment through a fingerprint password or a digital password after the confirmation of the customer.

Alternatively, in the case of collection failure in the identification information of the electric scooter to be returned, timing is started, and at least one of the following instruction information is given to a background server during the timing: a repair instruction for prompting that the electric scooter needs to be repaired, and an assistance instruction for prompting that the access port needs to be opened by remote assistance, wherein if time reaches a predetermined time, the access port is automatically opened.

Figure 6:
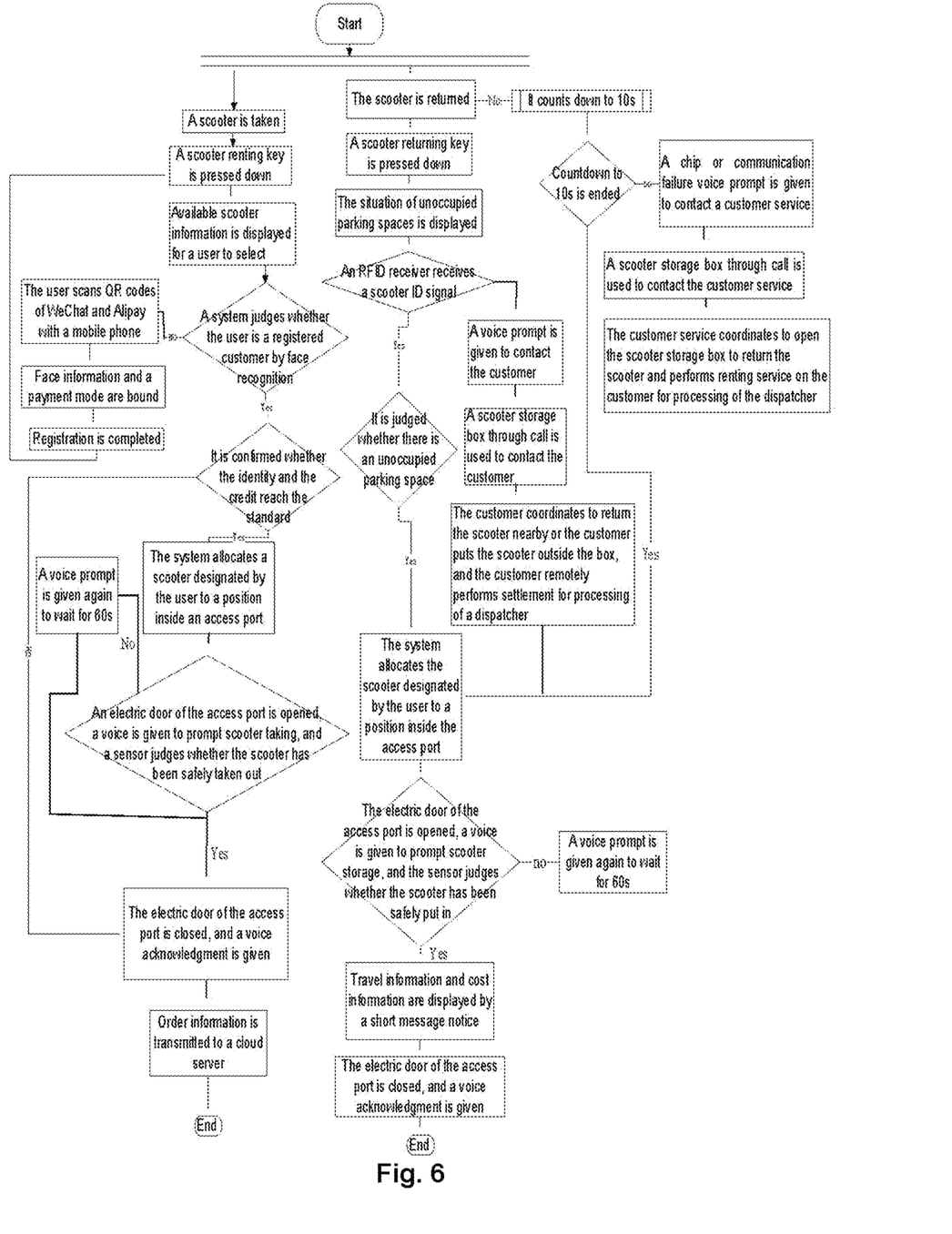
FIG. 6 illustrates a schematic diagram of an alternative electric scooter storage method based on scooter storage box according to an embodiment of this application.

FIG. 6 is a schematic diagram of another alternative electric scooter storage method based on scooter storage box according to an embodiment of this application. As shown in FIG. 6, the method includes the steps as follows.

In step 1, a scooter is taken.
In step 2, a scooter renting key is pressed down.
In step 3, available scooter information is displayed for a user to select.

In step 4, a system judges whether the user is a registered customer by face recognition, if so, step 5 is performed, and otherwise, step 10 is performed.

In step 5, it is confirmed whether the identity and the credit reach the standard, if so, step 6 is performed, and otherwise, the flow is ended.

In step 6, the system allocates a scooter designated by the user to a position inside an access port.

In step 7, an electric door of the access port is opened, a voice is given to prompt scooter taking, a sensor judges whether the scooter has been safely taken out, if so, step 8 is performed, and otherwise, step 13 is performed.

In step 8, the electric door of the access port is closed, and a voice acknowledgment is given.

In step 9, order information is transmitted to a cloud server.

In step 10, the user scans QR codes of WeChat and Alipay with a mobile phone.

In step 11, face information and a payment mode are bound.

In step 12, registration is completed.
In step 13, a voice prompt is given again to wait for 60 s.
In step 14, the user returns the scooter.
In step 15, a scooter returning key is pressed down.
In step 16, the situation of unoccupied parking spaces is displayed.

In step 17, an RFID receiver receives a scooter ID signal, if so, step 18 is performed, and otherwise, step 23 is performed.

In step 18, it is judged whether there is an unoccupied parking space, if so, step 19 is performed, and otherwise, step 20 is performed.

In step 19, the system allocates the scooter designated by the user to a position inside the access port.

In step 20, a voice prompt is given to contact the customer.

In step 21, a scooter storage box through call is used to contact the customer.

In step 22, the customer returns the scooter or the customer puts the scooter outside the box, the customer remotely performs settlement for processing of a dispatcher, and step 19 is performed.

In step 23, it counts down to 10 s.
In step 24, countdown to 10 s is ended, if a prompt is received, step 19 is performed, and otherwise, step 25 is performed.

In step 25, a chip or communication failure voice prompt is given to contact a customer service.

In step 26, a scooter storage box through call is used to contact the customer service.

In step 27, the customer service coordinates to open the scooter storage box to return the scooter and performs renting service on the customer for processing of the dispatcher, and step 19 is performed.

In step 28, the electric door of the access port is opened, a voice is given to prompt scooter storage, the sensor judges whether the scooter has been safely put in, if so, step 29 is performed, and otherwise, step 30 is performed.

In step 29, travel information and cost information are displayed by a short message notice.

In step 30, a voice prompt is given again to wait for 60 s.
In step 31, the electric door of the access port is closed, a voice acknowledgment is given, and the flow is ended.

The foregoing method provided in the embodiments of the disclosure facilitates sharing of an electric scooter. A scooter storage box is adopted for self-service renting operation of the electric scooter, so that not only the parking occupation is greatly reduced, but also the charging safety can be improved, and the field workload and working strength of scooter collection and charging are reduced, thus reducing the labor cost and the transportation cost.

The above is only the preferred embodiments of the disclosure, not intended to limit the disclosure. As will occur to those skilled in the art, the disclosure is susceptible to various modifications and changes. Any modifications, equivalent replacements, improvements and the like made within the spirit and principle of the disclosure shall fall within the scope of protection of the disclosure.

It is to be noted that terms used herein only aim to describe specific implementation manners, and are not intended to limit exemplar implementations of this application. Unless otherwise directed by the context, singular forms of terms used herein are intended to include plural forms. Besides, it will be also appreciated that when terms "contain" and/or "include" are used in the description, it is indicated that features, steps, operations, devices, assemblies and/or a combination thereof exist.

Unless otherwise specified, relative arrangements of components and steps elaborated in these embodiments, numeric expressions and numeric values do not limit the scope of the disclosure. Furthermore, it should be understood that for ease of descriptions, the size of each part shown in the drawings is not drawn in accordance with an actual proportional relation. Technologies, methods and devices known by those skilled in the related art may not be discussed in detail. However, where appropriate, the technologies, the methods and the devices shall be regarded as part of the authorized description. In all examples shown and discussed herein, any specific values shall be interpreted as only exemplar values instead of limited values. As a result, other examples of the exemplar embodiments may have different values. It is to be noted that similar marks and letters represent similar items in the following drawings. As a result, once a certain item is defined in one drawing, it is unnecessary to further discus the certain item in the subsequent drawings.

In the descriptions of the disclosure, it will be appreciated that locative or positional relations indicated by "front, back, up, down, left, and right", "horizontal, vertical, perpendicular, and horizontal", "top and bottom" and other terms are locative or positional relations shown on the basis of the drawings, which are only intended to make it convenient to describe the disclosure and to simplify the descriptions without indicating or impliedly indicating that the referring device or element must have a specific location and must be constructed and operated with the specific location, and accordingly it cannot be understood as limitations to the disclosure. The nouns of locality "inner and outer" refer to the inner and outer contours of each component.

For ease of description, spatial relative terms such as "over", "above", "on an upper surface" and "upper" may be used herein for describing a spatial position relation between a device or feature and other devices or features shown in the drawings. It will be appreciated that the spatial relative terms aim to contain different orientations in usage or operation besides the orientations of the devices described in the drawings. For example, if the devices in the drawings are inverted, devices described as "above other devices or structures" or "over other devices or structures" will be located as "below other devices or structures" or "under other devices or structures". Thus, an exemplar term "above" may include two orientations namely "above" and "below". The device may be located in other different modes (rotated by 90 degrees or located in other orientations), and spatial relative descriptions used herein are correspondingly explained.

In addition, it is to be noted that terms "first", "second" and the like are used to limit parts, and are only intended to distinguish corresponding parts. If there are no otherwise statements, the above terms do not have special meanings, such that they cannot be understood as limits to the scope of protection of the disclosure.

What is claimed is:

1. An electric scooter storage method based on a scooter storage box, the scooter storage box is configured to store at least one electric scooter, wherein the scooter storage box comprises a box body, a bracket arranged in the box body and configured to store the electric scooter, an access port, and an interaction device the method comprising:
    if the interaction device detects a scooter taking-out instruction, verifying identity information of a scooter taking-out user;
    if the verification is passed, conveying the electric scooter to the access port, and opening the access port; and
    if it is detected that the electric scooter is taken out from the bracket, recording renting, information of the electric scooter, the renting information at least comprising: user information of a scooter taking-out user who takes out the electric scooter, and identification information and renting time of the electric scooter;
    wherein the bracket comprises: a chassis with a recess portion and a carrying surface, the recess portion is configured to hold a wheel of the electric scooter, and the carrying surface urging against the lower surface of a pedaling portion of the electric scooter.

2. The method as claimed in claim 1, wherein in a case of providing a plurality of brackets in the scooter storage box, the scooter storage box further comprises: a conveying mechanism arranged inside the scooter storage box, the plurality of brackets being arranged on the conveying mechanism at intervals, wherein when the verification of the identity information of the scooter taking-out user is passed, the conveying mechanism is controlled to convey the bracket carrying the electric scooter in the plurality of brackets to the access port.

3. The method as claimed in claim 2, wherein the bracket of the scooter storage box is provided with a charging portion electrically connected to the electric scooter to charge the electric scooter, before conveying the electric scooter to the access port and opening the access port, the method further comprising:
    detecting the electric quantity of the electric scooter placed on each bracket;
    if the electric quantity is sufficient, conveying the electric scooter with the sufficient electric quantity to the access port; and
    if the electric quantity is insufficient, controlling the charging portion to charge or not based on the electric quantity of the electric scooter with the insufficient electric quantity.

4. The method as claimed in claim 2, wherein the conveying mechanism comprises:
    an annular conveying chain, arranged in the box body along a vertical direction; and
    a driving wheel, in driving connection with the annular conveying chain, the driving wheel being configured to drive the annular conveying chain to rotate,
    the plurality of brackets being hinged to the annular conveying chain along the circumference of the annular conveying chain.

5. The method as claimed in claim 1, wherein the interaction device comprises: an operation panel and a face recognition device, if a scooter taking-out key on the operation panel is pressed down, the scooter taking-out instruction is generated, facial feature information of the scooter taking-out user is recognized by the face recognition device, and the identity information of the scooter taking-out user is verified based on the facial feature information.

6. The method as claimed in claim 1, wherein in the case of verification failure, verification is performed again, or, the identity information is registered.

7. The method as claimed in claim 1, wherein in the process of detecting that the electric scooter is taken out from the bracket, a sensor senses whether the electric scooter is safely taken out, if so, the access port is closed, otherwise, prompt information is given, and the access port is controlled to be closed after delaying for a predetermined time, the prompt information is used for prompting that the electric scooter is not safely taken out.

8. The method as claimed in claim 1, wherein after recording renting information of the electric scooter, the method further comprises:
   generating order information, the order information at least comprising: an order number, and the identification information, renting time and charging information of the taken-out electric scooter; and
   sending the order information to a cloud server.

9. An electric scooter storage method based on a scooter storage box, the scooter storage box being configured to store an electric scooter, wherein the scooter storage box comprises a box body, a bracket arranged in the box body and configured to store the electric scooter, an access port, and an interaction device, the method comprising:
   if the interaction device detects a scooter returning instruction, collecting identification information of an electric scooter to be returned;
   if the collection succeeds, conveying an unoccupied bracket to the access port, and opening the access port; and
   if it is detected that the electric scooter is placed on the unoccupied bracket, determining that, the electric scooter is successfully returned, and generating charging information of the successfully returned electric scooter, the charging information at least comprising: user information of a scooter taking-out user who takes out the electric scooter, and, identification information, travel information and generated rent of the electric scooter.

10. The method as claimed in claim 9, wherein in the case of providing a plurality of brackets in the scooter storage box, the scooter storage box further comprises: a conveying mechanism arranged inside the scooter storage box, the plurality of brackets being arranged on the conveying mechanism at intervals, wherein when the scooter returning instruction is detected, the conveying mechanism is controlled to convey the unoccupied bracket in the plurality of brackets to the access port.

11. The method as claimed in claim 10, wherein the bracket of the scooter storage box is provided with a charging portion electrically connected to the electric scooter to charge the electric scooter, before conveying the unoccupied bracket to the access port and opening the access port, the method further comprising:
   detecting whether the charging portion arranged on the unoccupied bracket is in a normal state;
   if it is in the normal state, conveying the unoccupied bracket to the access port; and
   if it is in an abnormal state, detecting whether charging portions on other brackets are in the normal state, and if there is no bracket with a charging portion in the normal state, prohibiting from opening the access port.

12. The method as claimed in claim 10, wherein the conveying mechanism comprises:
   an annular conveying chain, arranged in the box body along a vertical direction; and
   a driving wheel, in driving connection with the annular conveying chain, the driving wheel being configured to drive the annular conveying chain to rotate,
   the plurality of brackets being hinged to the annular conveying chain along the circumference of the annular conveying chain.

13. The method as claimed in claim 9, wherein the interaction device comprises: an operation panel and a Radio Frequency Identification (RFID) receiver, if a scooter returning key on the operation panel is pressed down, the scooter returning instruction is generated, identification information of the electric scooter to be returned is received through the RFID receiver, and the access port is opened based on the identification information.

14. The method as claimed in claim 9, wherein in the case of collection failure in the identification information of the electric scooter to be returned, timing is started, and at least one of the following instruction information is given to a background server during the timing: a repair instruction for prompting that the electric scooter needs to be repaired, and an assistance instruction for prompting that the access port needs to be opened by remote assistance, wherein if time reaches a predetermined time, the access port is automatically opened.

15. The method as claimed in claim 9, wherein in the process of detecting that the electric scooter is placed on the unoccupied bracket, a sensor senses whether the electric scooter is safely put in, if so, the access port is closed, otherwise, prompt information is given, and the access port is controlled to be closed after delaying for a predetermined time, the prompt information is used for prompting that the electric scooter is not safely put in.

16. The method as claimed in claim 9, wherein after determining that the electric scooter is successfully returned, and generating charging information of the successfully returned electric scooter, the method further comprises:
   acquiring a payment result of paying for the charging information, and sending the charging information and/or the payment result to a cloud server; and
   completing, by the cloud server, corresponding order information based on the charging information and/or the payment result, and sending the final order information to the user who takes out the electric scooter.

* * * * *